United States Patent [19]

Inada et al.

[11] Patent Number: 4,907,446
[45] Date of Patent: Mar. 13, 1990

[54] FLOW SENSOR INCORPORATING A THERMORESISTOR

[75] Inventors: Masanori Inada; Naruki Suetake; Hichiro Ohtani; Tomoya Yamakawa, all of Hyogo, Japan

[73] Assignee: Mitsubishi Denki Kabushiki Kaisha, Tokyo, Japan

[21] Appl. No.: 312,110

[22] Filed: Feb. 21, 1989

[30] Foreign Application Priority Data

Feb. 24, 1988 [JP] Japan .............................. 63-23335[U]
Apr. 19, 1988 [JP] Japan .............................. 63-53420[U]

[51] Int. Cl.$^4$ .......................................... G01M 15/00
[52] U.S. Cl. ................................. 73/118.2; 73/204.18
[58] Field of Search ............. 73/118.2, 204.18, 204.19; 364/571.01, 571.02, 571.03, 571.05, 571.06

[56] References Cited

U.S. PATENT DOCUMENTS 3,975,951 8/1976 Kohama et al. .................... 73/118.2
4,373,387 2/1983 Nishimura et al. ............. 73/118.1 X

FOREIGN PATENT DOCUMENTS 156832 10/1987 Japan .
165518 10/1987 Japan .

Primary Examiner—Jerry W. Myracle
Attorney, Agent, or Firm—Sughrue, Mion, Zinn, Macpeak and Seas

[57] ABSTRACT

A thermal flow sensor constructed by a temperature control circuit which includes a bridge circuit consisting of a thermoresistor arranged in a fluid passageway and a plurality of resistors, and a correction circuit for correcting the output of the control circuit in accordance with a gradient of a flow rate detecting characteristic is described. The correction circuit includes a subtracting circuit for subtracting a predetermined value from an output of the control circuit, a voltage dividing circuit for dividing an output of the subtracting circuit and an arithmetic operating circuit for performing either an addition or a substraction between outputs of the dividing circuit and the control circuit. The correction circuit may further include an amplifying circuit for amplifying the output of the dividing circuit and may change the arithmetic operating circuit to the circuit for adding the outputs of the arithmetic operating circuit and the control circuit and for subtracting the output of the subtracting circuit from the added voltage.

10 Claims, 6 Drawing Sheets

Fig. 1(a)    Fig. 1(b)
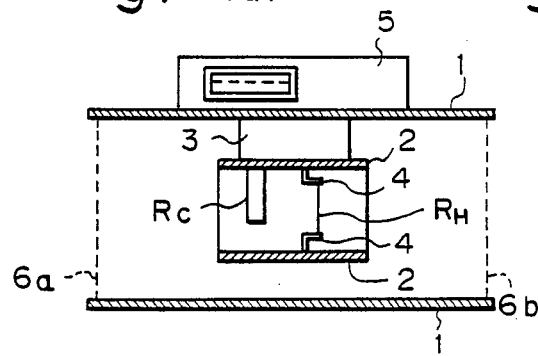
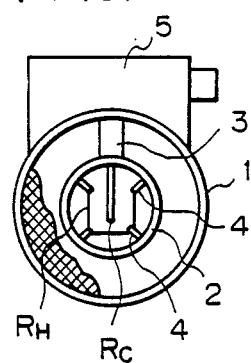
Fig. 2
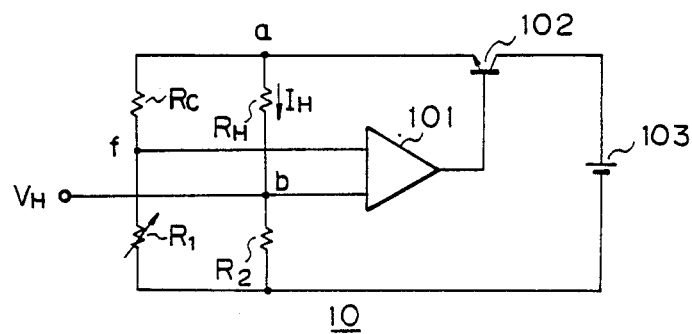
Fig. 3
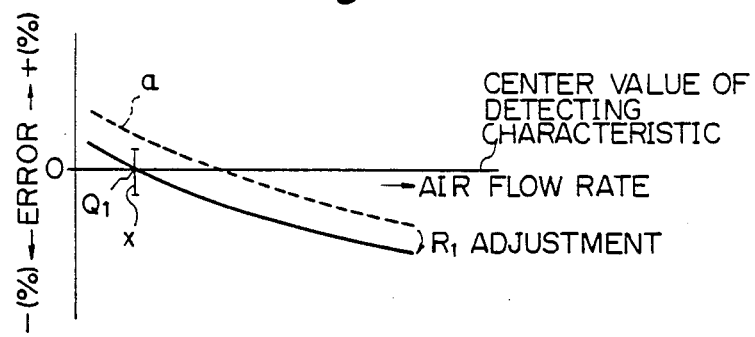

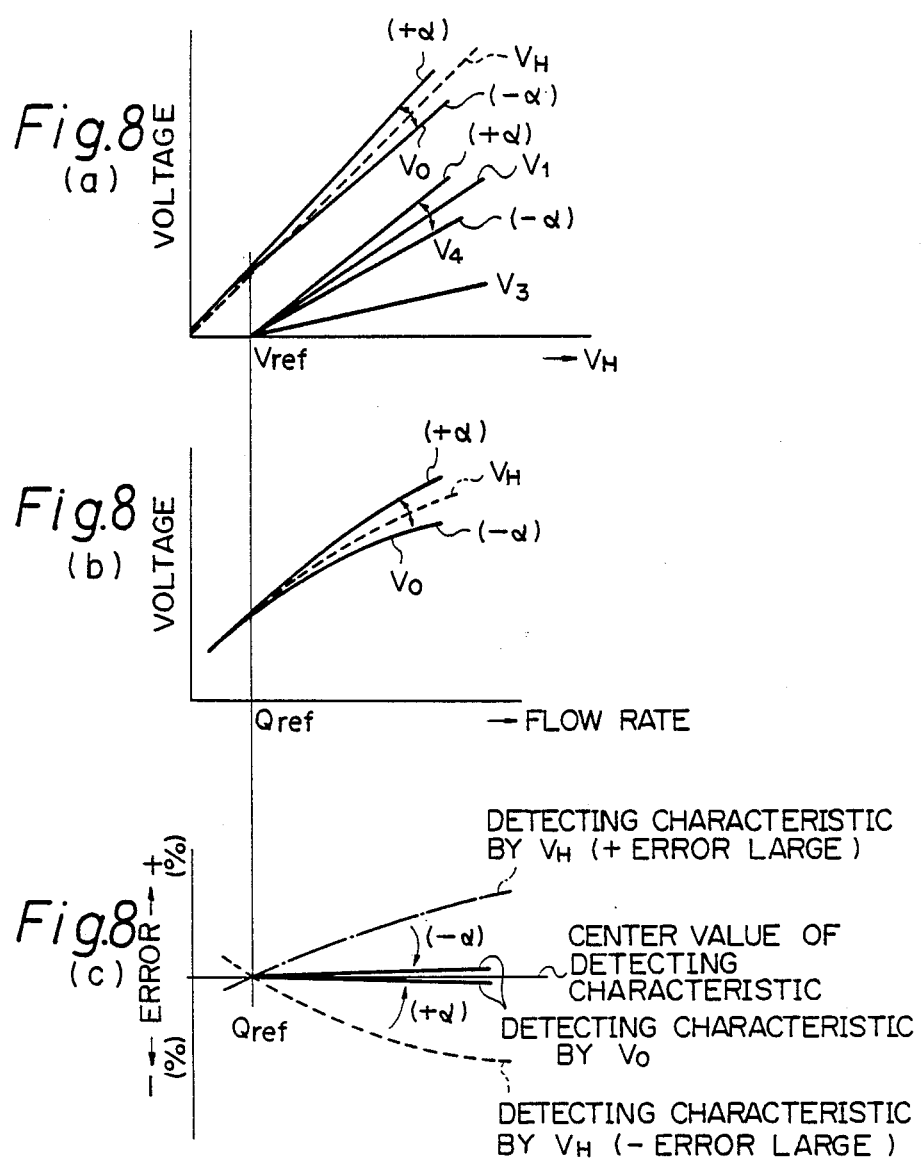

FLOW SENSOR INCORPORATING A THERMORESISTOR

BACKGROUND OF THE INVENTION

1. Field of the Invention

The present invention relates to a flow sensor for measuring a fluid flow rate by using a thermoresistor (heating resistor).

2. Related Background Art

It has been conventional to use a flow sensor to the type in which a flow rate is measured by detecting the thermal equilibrium state of a bridge circuit including a thermoresistor (heating resistor) disposed in the fluid concerned. A conventional air flow sensor that utilizes a platinum wire as a heating resistor will be described hereinbelow.

FIG. 1(a) is a vertical side sectional view showing the structure of a thermal air flow sensor which utilizes a platinum wire as a heating resistor. FIG. 1(b) shows a front view of the structure shown in FIG. 1(a). In FIGS. 1(a) and 1(b), a measuring tube passageway 2 is supported by a supporting member 3 at a predetermined position in a housing 1, which serves as a main passageway for a fluid. A plurality of hot wire supporting members 4 are provided on the inner surface of the tube passageway 2. A hot wire $R_H$ is reeved through the hot wire supporting members 4 in the plane which is normal to the flow of air.

An air temperature sensor $R_c$ is also arranged in the measuring tube passageway 2. Electrically connecting lead wires of the hot wire $R_H$ and air temperature sensor $R_c$ are lead to the inside of a control circuit setting portion 5 provided on the outer periphery of the housing 1 through holes (not shown) formed in the housing 1, tube passageway 2, and supporting member 3 and are connected to a control circuit provided in the setting portion 5. Protecting nets 6a and 6b are attached to the opening portions on both sides of the housing 1.

FIG. 2 is a diagram showing a bridge circuit including the hot wire $R_H$ and air temperature sensor $R_c$ and a temperature control circuit 10 adapted to control temperature so that the bridge circuit maintains a thermal equilibrium state. The bridge circuit comprises resistors $R_1$ and $R_2$, hot wire $R_H$, and air temperature sensor $R_c$. Both input terminals of a differential amplifier 101 are connected to connecting points b and f of the bridge circuit. An output of the differential amplifier 101 is connected to a base of a transistor 102. An emitter of the transistor 102 is connected to one end a of the bridge circuit and a collector is connected to a positive polarity terminal of a DC power source 103.

The operation will now be briefly explained. Since the operation of a temperature control circuit is well known, detailed description thereof is omitted here. A simple explanation of the operation will be given for better understanding. When the voltages at the connecting points b and f are equal, the temperature control circuit reaches an equilibrium state. At this time, a current $I_H$ corresponding to the flow rate flows through the hot wire $R_H$. A voltage $V_H$ at the connecting point b is expressed by $V_H = I_H \cdot R_2$ and this voltage is used as a flow rate signal.

In general, in order to correct any variation in measurement resulting from variations in the resistance values and resistance temperature coefficients of the hot wire $R_H$ and air temperature sensor $R_c$ or the resistance values of the resistors $R_1$ and $R_2$, the detection flow rate characteristic is changed in parallel by adjusting the resistance value of the resistor $R_1$ so that a detection output value at a predetermined flow rate (ordinarily, a relatively low flow rate) is adjusted to an objective value.

FIG. 3 is a detection flow rate characteristic diagram for explaining the foregoing correction. The resistance value of the resistor $R_1$ is adjusted so that a characteristic curve a before adjustment by the resistor $R_1$ will lie within a given objective value range x at a predetermined flow rate $Q_1$.

In the thermal flow sensor including the temperature control circuit 10 mentioned above the resistance value of the resistor $R_1$ is adjusted (as shown in FIG. 3, the detecting characteristic is adjusted by changing the detection flow rate characteristic in parallel) in order to improve the measuring accuracy. However, it is impossible to adjust the gradient of the flow rate characteristic (flow rate dependency of the deviation from the center value of the detecting characteristic at each flow rate hereinafter referred to as a characteristic gradient) which is mainly based on structural and dimensional variations such as variations in the dimensions of the housing 1 and measuring tube passageway 2, variations in their relative positions changes in alignment of the center axis of the tube passageway 2 with respect to flow direction, variation of the reeving position of the hot wire $R_H$, and the like. Measuring accuracy is not improved at flow rates other than the adjustment flow rate point $Q_1$. This is particularly true at the flow rate which is largely deviated from the adjustment flow rate point $Q_1$. There are the drawbacks as mentioned above.

When the resistance value of the resistor $R_1$ is again adjusted in order to adjust the detection output at a flow rate point other than the adjustment flow rate point $Q_1$, the detection output at the flow rate point $Q_1$ also changes, so that the detecting accuracy cannot be improved at all of the flow rates.

SUMMARY OF THE INVENTION

The present invention is intended to solve the foregoing problems and it is an object of the invention to provide a flow sensor incorporating a thermoresistor in which the gradient of the flow rate characteristic can be adjusted, detection errors are small in the whole flow rate range, and a high accuracy is obtained.

Another object of the invention is to provide a flow sensor incorporating a thermoresistor which can adjust a variation in any of the (+) and (−) directions by using the same circuit and can perform the adjustment at a high accuracy by simple adjusting means.

To accomplish the above objects, a flow sensor incorporating a thermoresistor according to the invention is characterized by comprising: a subtracting circuit to which a terminal voltage across a resistor connected serially with a thermoresistor in a bridge circuit including the thermoresistor is input, and which subtracts a predetermined voltage from the terminal voltage and outputs the difference therebetween when the terminal voltage is above the predetermined voltage; and an arithmetic operating circuit to which both of the terminal voltage and an output voltage, corresponding to the difference, of the subtracting circuit are input and which subtracts or adds the output voltage of the subtracting circuit from or to the terminal voltage, wherein a correcting sensor output is output from the arithmetic operating circuit.

A thermal flow sensor according to the invention is further characterized by comprising: a voltage dividing circuit for dividing an output voltage of the above subtracting circuit; an amplifying circuit for amplifying the divided voltage; and an arithmetic operating circuit for adding an output voltage of the amplifying circuit and an output voltage of a temperature control circuit and for subtracting the output voltage of the subtracting circuit from the resultant added voltage, wherein by changing a voltage dividing ratio of the voltage dividing circuit, a correcting sensor output in which detection errors were adjusted in any of the (+) and (−) directions can be output form the arithmetic operating circuit.

BRIEF DESCRIPTION OF THE DRAWINGS

FIGS. 1(a) and 1(b) are respectively a vertical side sectional view and a front view showing structure of a air flow sensor using a platinum wire as a heating resistor;

FIG. 2 is a diagram showing a temperature control circuit of the heating resistor;

FIG. 3 is a graph for explaining an adjusting method in the temperature control circuit in FIG. 2;

FIGS. 8(a) to 8(c) are graphs for explaining the operation of the embodiment in FIG. 7.

DESCRIPTION OF THE PREFERRED EMBODIMENTS

Figure 4:
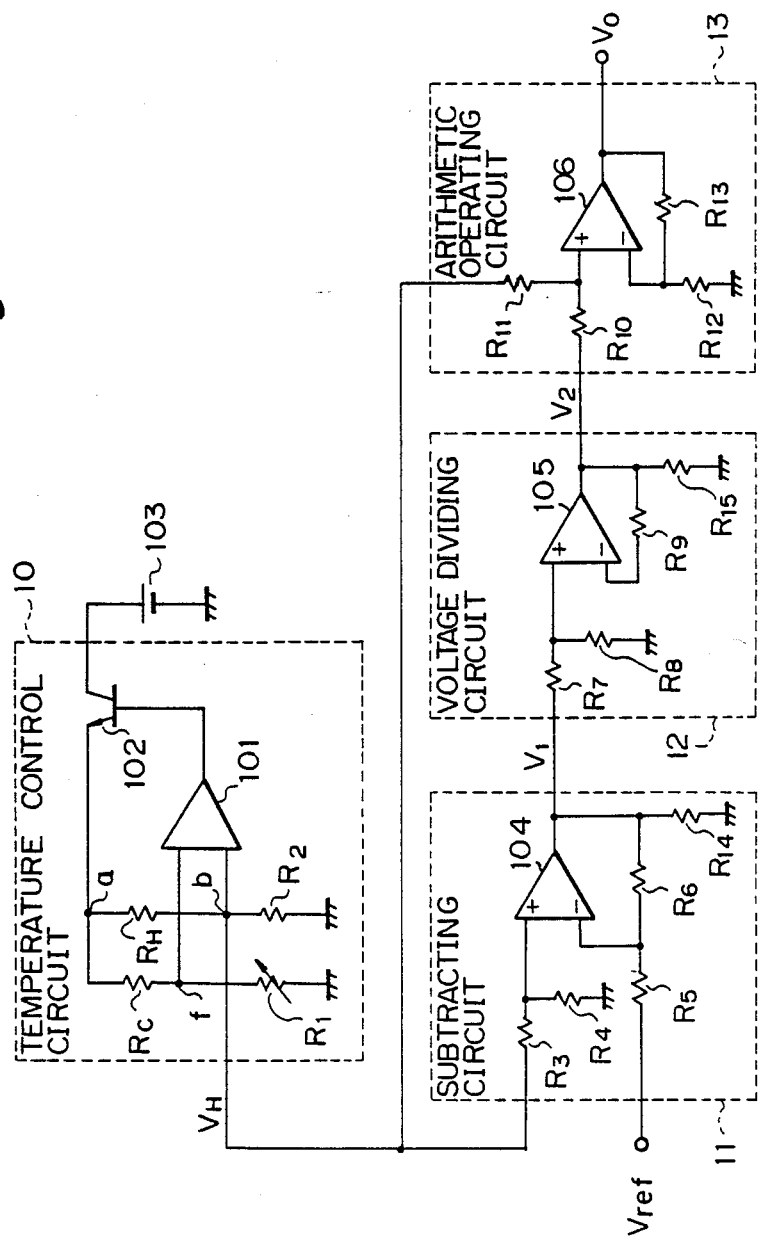
FIGS. 4 and 6 are diagrams showing thermal flow sensors according to an embodiment of the present invention.

An embodiment of the present invention will be described in detail hereinbelow with reference to the drawings. FIG. 4 shows a circuit arrangement of a air flow sensor incorporating a thermoresistor according to an embodiment of the invention. Reference numeral 10 denotes the conventional control circuit shown in FIG. 2. A subtracting circuit 11 comprises resistors $R_3$ through $R_6$ and $R_{14}$ and an operational amplifier 104. The circuit 11 operates to subtract a predetermined voltage $V_{ref}$ from the output voltage $V_H$ of the control circuit 10. A voltage dividing circuit 12 comprises resistors $R_7$ through $R_9$ and $R_{15}$ and an operational amplifier 105 and divides an output voltage $V_1$ of the subtracting circuit 11 by the resistor $R_7$ and $R_8$, thereby outputs a divided voltage $V_2$. An arithmetic operating circuit 13 comprises resistors $R_{10}$ through $R_{13}$ and an operational amplifier 106 and adds the output voltage $V_H$ of the control circuit 10 and the output voltage $V_2$ of the voltage divider circuit 12.

Figure 5:
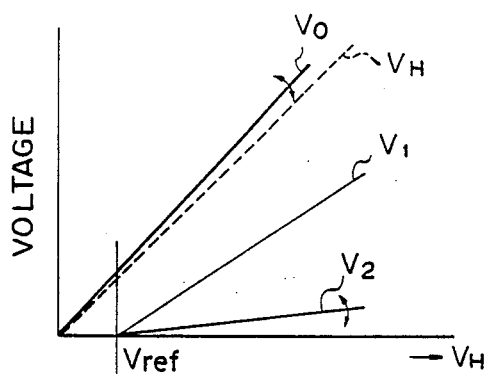
FIGS. 5(a) to 5(c) are graphs for explaining the operation of the embodiment in FIG. 4.
Figure 5:
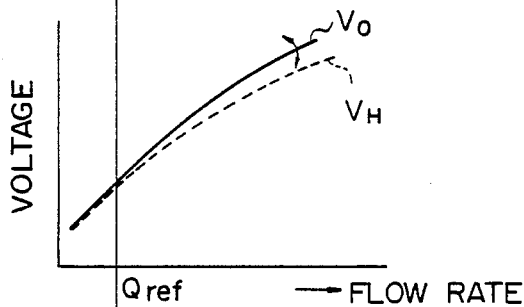
Figure 5:
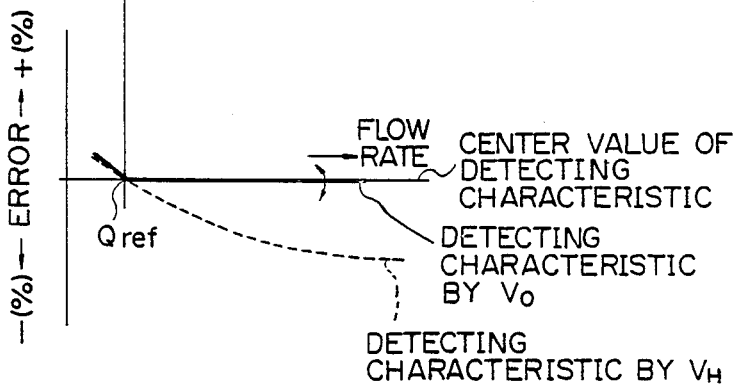

The operation of the circuit of FIG. 4 will now be described also with reference to FIG. 5. The output voltage $V_1$ of the subtracting circuit 11 is set to a value which satisfies the following equation in accordance with each resistance value of the resistors $R_3$ through $R_6$.

$$V_1 = \frac{R_4}{R_3 + R_4} \times \frac{R_5 + R_6}{R_5} \times V_H - \frac{R_4}{R_5} \times V_{ref}$$

When the resistance values are set to proper values such that $R_3 = R_4$ and $R_5 = R_6$, the above equation can be represented as follows:

$$V_1 = V_H - V_{ref}$$

Since the operational amplifier 104 operate by the power source voltage of the positive polarity, the output voltage $V_1$ is not set to a negative value. $V_1$ is set to 0 when $V_H < V_{ref}$ and a characteristic $V_1$ can be represented as shown in FIG. 5(a). The voltage dividing circuit 12 receives the output voltage $V_1$ of the subtracting circuit 11. The output voltage $V_2$ of the voltage dividing circuit 12 is set to a value which satisfies the following equation in accordance with the resistance values $R_7$ and $R_8$ of the resistors $R_7$ and $R_8$.

$$V_2 = \frac{R_8}{R_7 + R_8} \times V_1$$

(where $V_H < V_{ref}$, $V_2 = 0$). When the resistance values $R_7$ and $R_8$ are changed, as shown by the characteristic $V_2$ shown in FIG. 5(a), its gradient changes in accordance with the output voltage $V_H$ of the control circuit 10, and the predetermined voltage $V_{ref}$ is used as a base point. The arithmetic operating circuit 13 receives both the output voltage $V_H$ of the control circuit 10 and the output voltage $V_2$ of the voltage dividing circuit 12. An output voltage $V_O$ of the circuit 13 is set to a value which satisfies the following equation in accordance with the resistance values $R_{10}$ through $R_{13}$ of the resistors $R_{10}$ through $R_{13}$.

$$V_O = \frac{R_{12} + R_{13}}{R_{12}} \times \frac{R_{10}}{R_{10} + R_{11}} \times V_H + \frac{R_{12} + R_{13}}{R_{12}} \times \frac{R_{11}}{R_{10} + R_{11}} \times V_2$$

When each of the resistance values is set to a proper value such that $R_{10} = R_{11}$ and $R_{12} = R_{13}$, $V_O$ can be represented as follows:

$$V_O = V_H + V_2$$

From the relationships among $V_1$, $V_2$, $V_H$ and $V_{ref}$, $$V_O = V_H + \frac{R_8}{R_7 + R_8} \times (V_H - V_{ref})$$

is obtained. When $V_H < V_{ref}$, the output voltage $V_O$ is equal to $V_H$ irrespective of the resistance values $R_7$ and $R_8$. When $V_H > V_{ref}$, the output voltage $V_O$ is set to the output voltage which is obtained by adding the value derived by multiplying the voltage dividing ratio according to the resistance values $R_7$ and $R_8$ to the value of $(V_H - V_{ref})$ to $V_H$. Therefore, by combining the subtracting circuit 11, voltage dividing circuit 12, and arithmetic operating circuit 13, an amplifying circuit of which an amplification facction is equal to 1 when $V_H < V_{ref}$ and an amplification factor is equal to $$1 + \frac{R_8}{R_7 + R_8}$$

can be obtained.

FIG. 5(b) shows the relationships between the air flow rate, the output voltage $V_H$ of the control circuit 10, and the output voltage $V_O$ of the arithmetic operating circuit 13. FIG. 5(c) shows the relationships between the air flow rate and the detection errors of the air flow sensor depending on the output voltages $V_H$ and $V_O$. As shown in FIG. 5(b), the output voltage $V_O$ of the arithmetic operating circuit 13 is set to an arbitrary characteristic in accordance with the resistance values $R_7$ and $R_8$ only when the flow rate is not smaller than an air flow rate $Q_{ref}$ corresponding to the preset voltage $V_{ref}$. Therefore, if the detection error in the (−) direction is large when the detection error due to the output voltage $V_H$ of the control circuit 10 is larger than the air flow rate $Q_{ref}$ as shown in FIG. 5(c), the detection error at any flow rate which is above $Q_{ref}$ can be reduced by regulating the resistance values $R_7$ and $R_8$.

According to the embodiment mentioned above, the detecting characteristic at flow rates which are above, the predetermined flow rate $Q_{ref}$ can be arbitrarily adjusted without changing the detecting characteristic at flow rates which are less than the $Q_{ref}$. The predetermined flow rate $Q_{ref}$ is set to a relatively low flow rate and the detecting characteristic at the flow rate $Q_{ref}$ is set (adjusted) to a predetermined characteristic by adjusting the resistor $R_1$ in the control circuit 10 in the conventional flow sensor. Thereafter, the detecting characteristic at a flow rate larger than the predetermined flow rate $Q_{ref}$ is set (adjusted) to a predetermined characteristic by regulating the voltage dividing ratio of the voltage dividing circuit 12. By this adjusting method, a flow sensor deriving small detection errors in a whole flow rate range can be obtained.

Figure 6:
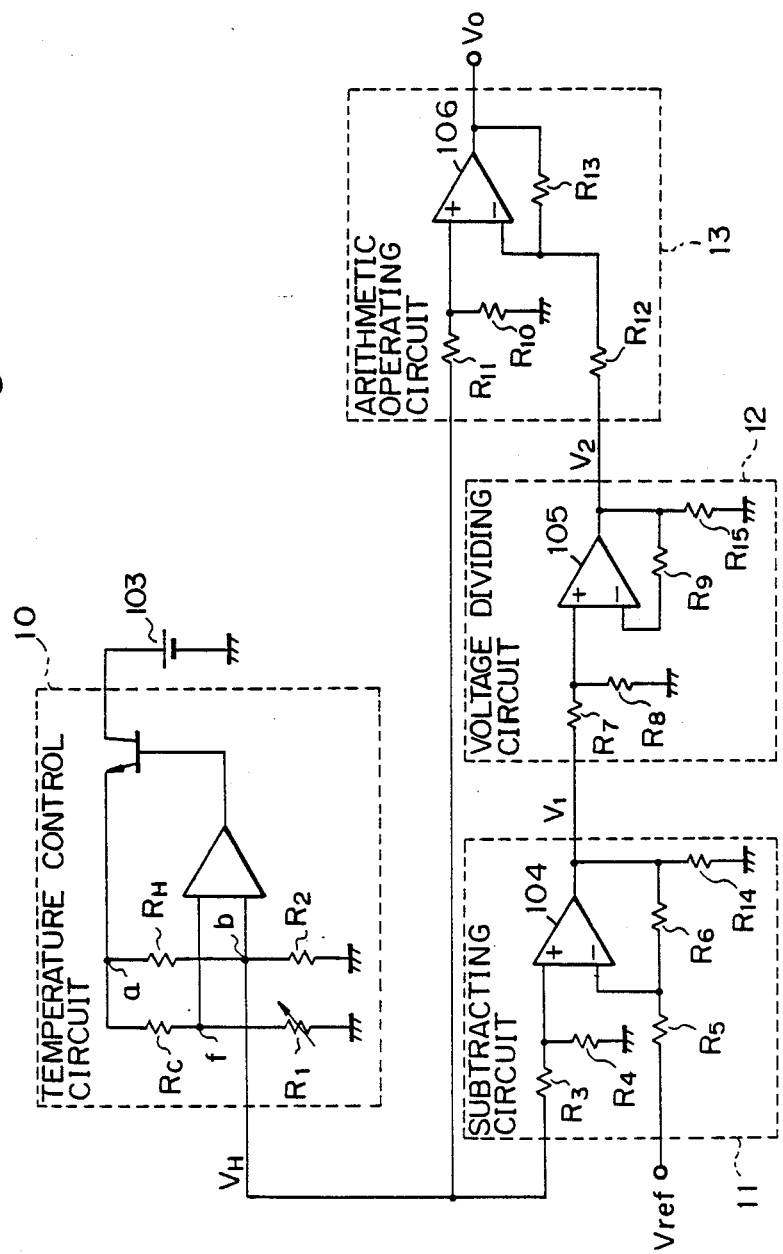

Although the embodiment has been described with respect to the example in which the output voltage $V_2$ of the voltage dividing circuit 12 is added to the output voltage $V_H$ of the control circuit 10 by the arithmetic operating circuit 13 and the error in the (−) direction at a large flow rate as shown in FIG. 5(c) is adjusted, the error in the (+) direction at a large flow rate can be also adjusted by subtracting $V_H$ from $V_2$ by the arithmetic operating circuit 13 as shown in FIG. 6.

The above-described embodiments have been constructed such that the error in either the (−) or (+) directions can be adjusted. However, in the third embodiment of the invention which will be explained hereinafter with reference to FIGS. 7 and 8, the errors in both the (−) and (+) directions can be adjusted.

Figure 7:
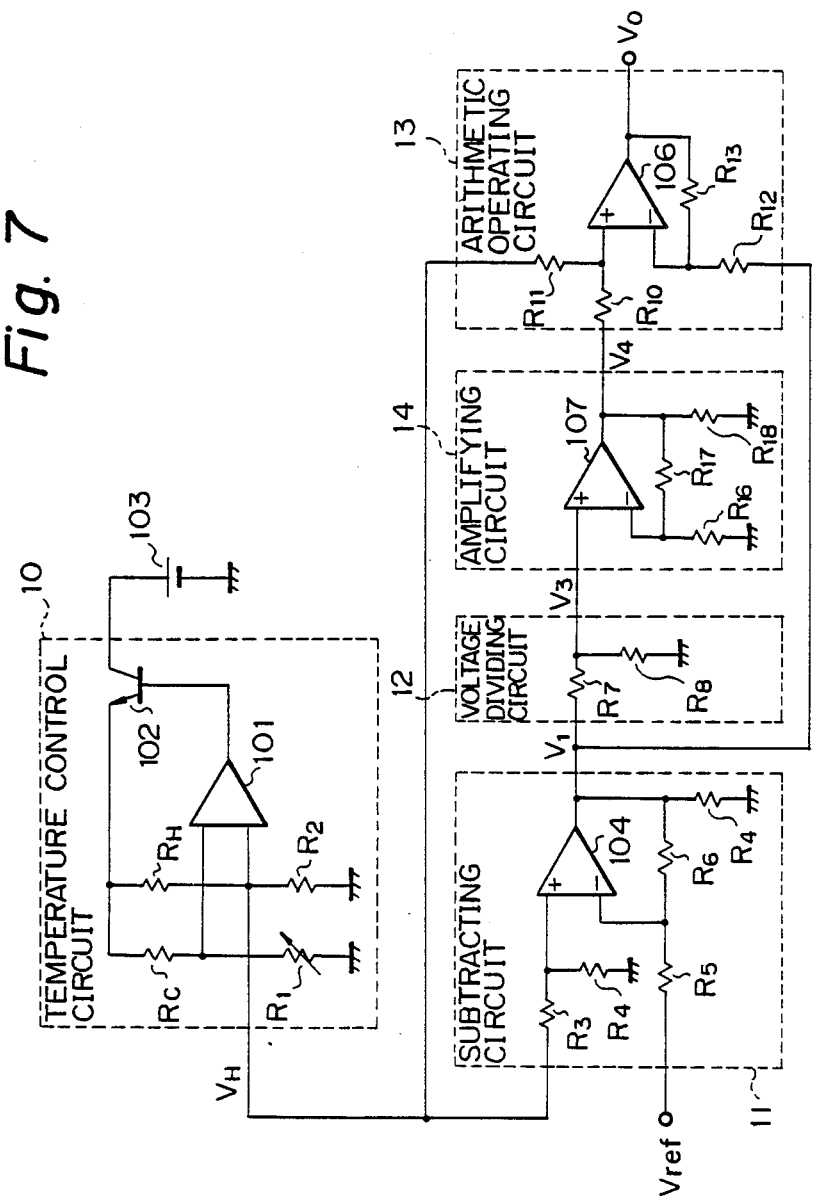
FIG. 7 is a circuit diagram showing a thermal flow sensor according to another embodiment of the invention.

In FIG. 7, reference numeral 10 denotes the temperature control circuit; 11 indicates the subtracting circuit; 12 the voltage dividing circuit comprising the resistors $R_7$ and $R_8$; 13 the arithmetic operating circuit; and 14 the amplifying circuit comprising resistors $R_{16}$, $R_{17}$ and $R_{18}$ and an operational amplifier 107.

The temperature control circuit 10, subtracting circuit 11, and arithmetic operating circuit 13 are constructed in a manner similar to FIG. 4 or 6. The similar parts and components as those shown in FIG. 4 or 6 are designated by the same reference numerals and their detailed descriptions are omitted.

The voltage dividing circuit 12 divides the output voltage $V_1$ of the subtracting circuit 11 by the resistors $R_7$ and $R_8$. The series circuit of the resistors $R_7$ and $R_8$ is connected between an output terminal of the subtracting circuit 11 and the ground.

An output voltage $V_3$ of the voltage dividing circuit 12 which is obtained at a node between the resistors $R_7$ and $R_8$ is applied to a (+) input terminal of the operational amplifier 107 of the amplifying circuit 14. A (−) input terminal of the operational amplifier 107 is connected to the ground through the resistor $R_{16}$.

On the other hand, the resistor $R_{17}$ is connected between the output terminal of the operational amplifier 107 and its (−) input terminal. The output terminal of the operational amplifier 107 is, further, connected to the ground through the resistor $R_{18}$.

An output voltage $V_4$ of the amplifying circuit 14 is applied to a (+) input terminal of the operational amplifier 106 through the resistor $R_{10}$ in the arithmetic operating circuit 13.

The output voltage $V_1$ of the subtracting circuit 11 is applied to a (−) input terminal of the operational amplifier 106 through the resistor $R_{12}$ in the arithmetic operating circuit 13. The other section is constructed in a manner similar to that in FIG. 4 or 6.

The operation will now be described. The operation of the subtracting circuit 11 is substantially the same as those in the conventional examples of FIGS. 4 and 6. By setting the resistance values such that $R_3=R_4$ and $R_5=R_6$, the output voltage $V_1$ is obtained as follows:

$V_1 = V_H - V_{ref}$, when $V_H \geq V_{ref}$ $V_1 = 0$, when $V_H < V_{ref}$

The output voltage $V_3$ of the voltage dividing circuit 12 is obtained as follows in accordance with the resistance values $R_7$ and $R_8$ of the resistors $R_7$ and $R_8$ in the voltage dividing circuit 12;

$$V_3 = \frac{R_8}{R_7 + R_8} \times V_1, \text{ when } V_H \geq V_{ref}$$

$$V_3 = 0, \text{ when } V_H < V_{ref}$$

The output voltage $V_3$ is input to the amplifying circuit 14. The output voltage $V_4$ of the amplifying circuit 14 is obtained as follows in accordance with the resistance values $R_{16}$ and $R_{17}$ of the resistors $R_{16}$ and $R_{17}$:

$$V_4 = \frac{R_{16} + R_{17}}{R_{16}} \times V_3 = \frac{R_{16} + R_{17}}{R_{16}} \times \frac{R_8}{R_7 + R_8} \times V_1, \text{ when } V_H \geq V_{ref}$$

The arithmetic operating circuit 13 receives the output voltage $V_H$ of the temperature control circuit 10, the output voltage $V_4$ of the amplifying circuit 14, and the output voltage $V_1$ of the subtracting circuit 11. The output voltage $V_O$ of the circuit 13 is set to a value which satisfies the following equation in accordance with the resistance values $R_{10}$, $R_{11}$, $R_{12}$ and $R_{13}$ of the resistors $R_{10}$, $R_{11}$, $R_{12}$ and $R_{13}$:

$$V_O = \frac{R_{12} + R_{13}}{R_{12}} \times \frac{R_{10}}{R_{10} + R_{11}} \times V_H + \frac{R_{12} + R_{13}}{R_{12}} \times \frac{R_{11}}{R_{10} + R_{11}} \times V_4 - \frac{R_{13}}{R_{12}} \times V_1, \text{ when } V_H \geq V_{ref}$$

By setting the resistance values to proper values such that $R_{10}=R_{11}$ and $R_{12}=R_{13}$, $V_O$ can be represented as follows:

$V_O = V_H + V_4 - V_1$

From the relations between the output voltages $V_1$, $V_3$, $V_4$ and $V_H$ and the preset voltage $V_{ref}$, the voltage $V_O$ is expressed as follows:

$$V_0 = V_H + \left( \frac{R_8}{R_7 + R_8} \times \frac{R_{16} + R_{17}}{R_{16}} - 1 \right) \times (V_H - V_{ref}),$$

when $V_H \geq V_{ref}$ $V_0 = V_H$, when $V_H < V_{ref}$

In the above equation, when the resistance values $R_7$, $R_8$, $R_{16}$ and $R_{17}$ are set to proper values such that $R_7 = R_8$ and $R_{17} = R_{16} \times (1 \pm \alpha)$, the voltage $V_O$ becomes as follows:

$$\begin{aligned} V_0 &= V_H + \{\tfrac{1}{2}(2 \pm \alpha) - 1\} \times (V_H - V_{ref}) \\ &= V_H \pm \tfrac{1}{2}\alpha(V_H - V_{ref}), \text{ when } V_H \geq V_{ref} \\ V_0 &= V_H, \text{ when } V_H < V_{ref} \end{aligned}$$

Therefore, the output voltage $V_O$ of the arithmetic operating circuit 13 is set to $V_O = V_H$ irrespective of the resistance values $R_{16}$ and $R_{17}$ when $V_H$ is under $V_{ref}$. On the contrary, when $V_H$ is above $V_{ref}$, the value which is obtained by multiplying the coefficient corresponding to the ratio of the resistance values $R_{16}$ and $R_{17}$ to the value of $(V_H - V_{ref})$ is added to $V_H$ or subtracted from $V_H$. Particularly, when $R_{16} = R_{17}$, $V_O$ is equal to $V_H$ independently of the relationship in value between the values of $V_H$ and $V_{ref}$.

FIG. 8(a) is a diagram showing characteristics of the foregoing voltages. In dependence on the value of $\alpha$ which is determined by the ratio of the resistance values $R_{16}$ and $R_{17}$, the output voltage $V_4$ of the amplifying circuit 14 changes. The diagram shows that the characteristics of the output voltage $V_1$ of the subtracting circuit 11 is used as a center reference. The output voltage $V_O$ of the arithmetic operating circuit 13 changes in the $(-)$ and $(+)$ directions in which the characteristic of $V_O = V_H$ is used as a center reference.

FIG. 8(b) is a diagram showing the relationships between the air flow rate, the output voltage of the temperature control circuit 10, and the output voltage $V_O$ of the arithmetic operating circuit 13. FIG. 8(c) is a diagram showing the relationships between the air flow rate and the detection errors of the air flow sensor depending on the output voltages $V_H$ and $V_O$. As shown in FIG. 8(c), the output voltage $V_O$ of the arithmetic operating circuit 13 can be set to an arbitrary characteristic in the $(+)$ and $(-)$ direction in accordance with the resistance values $R_{17}$ and $R_{18}$ in which the output voltage $V_H$ of the temperature control circuit 10 is used as a center voltage only in the case of a flow rate which is not smaller than the predetermined air flow rate $Q_{ref}$ corresponding to the preset voltage $V_{ref}$.

Therefore, as shown in FIG. 8(c), at a flow rate that is larger than the air flow rate $Q_{ref}$, when the detection error due to the output voltage $V_H$ of the temperature control circuit 10 exists on the $(-)$ side, the air flow rate can be adjusted in the direction of the $(+\alpha)$ side and when the detection error exists on the $(+)$ side, the air flow rate can be adjusted in the direction of the $(-\alpha)$ side. In this manner, the adjustment can be easily performed by the same circuit construction.

Although the embodiments have been described with respect to the case where the resistance values are set such that $R_3 = R_4$, $R_5 = R_6$, $R_7 = R_8$, $R_{10} = R_{11}$ and $R_{12} = R_{13}$, the similar effect can be also derived even if the resistance values are set to other arbitrary values in accordance with the desired detecting characteristic.

Although the illustrative embodiments of the present invention have been described in greater detail with reference to the accompanying drawings, it is to be understood that the invention is not limited to the precise embodiment. Various changes or modifications may be effected thereby by one skilled in the art without departing from the scope or spirit of the invention.

What is claimed is:

1. A thermal flow sensor constructed by a temperature control circuit which includes a bridge circuit consisting of a thermoresistor arranged in a fluid passageway and a plurality of resistors and controls a current which is supplied to said thermoresistor so that the bridge circuit keeps a predetermined thermal equilibrium state, in which the sensor measures by detecting a flow rate of a fluid flowing the passageway on the basis of the thermal equilibrium state, said sensor comprising:

a subtracting circuit for subtracting a predetermined voltage from an output voltage of said temperature control circuit which is obtained from a terminal voltage across a resistor connected serially with the thermoresistor in said bridge circuit;

a voltage dividing circuit for dividing an output voltage of said subtracting circuit; and an arithmetic operating circuit for performing either an addition or a subtraction between an output voltage of said voltage dividing circuit and the output voltage of the temperature control circuit, wherein the output voltage of the temperature control circuit is corrected in accordance with a gradient of a flow rate detecting characteristic and the corrected output voltage is output from said arithmetic operating circuit.

2. A sensor according to claim 1, wherein said voltage dividing circuit has means for variably controlling a voltage dividing ratio.

3. A sensor according to claim 2 wherein said arithmetic operating circuit includes a differential amplifier, both the output voltage of the temperature control circuit and the output voltage of the voltage dividing circuit are input to a non-inverting input terminal of said differential amplifier, an added output of the output voltages of the temperature control circuit and the voltage dividing circuit is generated from an output terminal of the amplifier, and thereby enabling a flow rate detecting characteristic in the negative direction to be corrected.

4. A sensor according to claim 2, wherein said arithmetic operating circuit includes a differential amplifier, the output voltage of the temperature control circuit is input to a non-inverting input terminal of said amplifier, the output voltage of the voltage dividing circuit is input to an inverting input terminal of the amplifier, an output voltage which is obtained by subtracting output voltage of the voltage dividing circuit from the output voltage of the temperature control circuit is generated from an output terminal of the amplifier, and thereby enabling a flow rate detecting characteristic in the positive direction to be corrected.

5. A sensor according to claim 1, wherein said arithmetic operating circuit includes a differential amplifier, both the output voltage of the temperature control circuit and the output voltage of the voltage dividing circuit are input to a non-inverting input terminal of said differential amplifier, an added output of the output voltages of the temperature control circuit and the voltage dividing circuit is generated from an output terminal of the amplifier, and thereby enabling a flow rate detecting characteristic in the negative direction to be corrected.

6. A sensor according to claim 1, wherein said arithmetic operating circuit includes a differential amplifier, the output voltage of the temperature control circuit is input to a non-inverting input terminal of said amplifier, the output voltage of the voltage dividing circuit is input to an inverting input terminal of the amplifier, an output voltage which is obtained by subtracting the output voltage of the voltage dividing circuit from the output voltage of the temperature control circuit is generated from an output terminal of the amplifier, and thereby enabling a flow rate detecting characteristic in the positive direction to be corrected.

7. A thermal flow sensor constructed by a temperature control circuit which includes a bridge circuit consisting of a thermoresistor arranged in a fluid passageway and a plurality of resistors and controls a current which is supplied to said thermoresistor so that said bridge circuit keeps a predetermined thermal equilibrium state, in which said sensor measures by detecting a flow rate of a fluid flowing the passageway on the basis of the thermal equilibrium state, said sensor comprising:
   a subtracting circuit for subtracting a predetermined voltage from an output voltage of said temperature control circuit which is obtained from a terminal voltage across a resistor connected serially with the thermoresistor in said bridge circuit;
   a voltage dividing circuit for dividing an output voltage of said subtracting circuit;
   an amplifying circuit for amplifying an output voltage of said voltage dividing circuit; and
   an arithmetic operating circuit for adding an output voltage of said amplifying circuit and the output voltage of the temperature control circuit and for subtracting the output voltage of the subtracting circuit from the added voltage,
   wherein the output voltage of the temperature control circuit is corrected in accordance with a gradient of a flow rate detecting characteristic and the corrected output voltage is output from the arithmetic operating circuit.

8. A sensor according to claim 7, wherein said amplifying circuit has means for controlling an amplification factor.

9. A sensor according to claim 8, wherein said arithmetic operating circuit includes a differential amplifier, both of the output voltage of the temperature control circuit and the output voltage of the amplifying circuit and input to a non-inverting input terminal of said differential amplifier, the output voltage of the subtracting circuit is input to an inverting input terminal of the differential amplifier, and said corrected output voltage is generated from an output terminal of the differential amplifier.

10. A sensor according to claim 7, wherein said arithmetic operating circuit includes a differential amplifier, both of the output voltage of the temperature control circuit and the output voltage of the amplifying circuit are input to a noninverting input terminal of said differential amplifier, the output voltage of the subtracting circuit is input to an inverting input terminal of the differential amplifier, and said corrected output voltage is generated from an output terminal of the differential amplifier.

* * * * *